United States Patent
Preston

(10) Patent No.: US 6,929,221 B2
(45) Date of Patent: Aug. 16, 2005

(54) RAM AIR PARACHUTE WITH TENSIONED TOP SKIN

(75) Inventor: Daniel Preston, Kew Gardens, NY (US)

(73) Assignee: Atair Aerospace Inc., Broklyn, NY (US)

( * ) Notice: Subject to any disclaimer, the term of this patent is extended or adjusted under 35 U.S.C. 154(b) by 8 days.

(21) Appl. No.: 10/315,555

(22) Filed: Dec. 9, 2002

(65) Prior Publication Data

US 2004/0108417 A1 Jun. 10, 2004

(51) Int. Cl.$^7$ .................. B64D 17/00; B64D 17/02
(52) U.S. Cl. .............. 244/146; 244/145; 244/142; 244/152; 244/126
(58) Field of Search .................. 244/126, 145–146, 244/142, 152

(56) References Cited

U.S. PATENT DOCUMENTS

| | | | | | |
|---|---|---|---|---|---|
| 3,945,592 | A | * | 3/1976 | Sutton | 244/152 |
| 4,191,349 | A | * | 3/1980 | Pravaz | 244/145 |
| 4,389,031 | A | * | 6/1983 | Whittington | 244/145 |
| 4,470,567 | A | * | 9/1984 | Puskas | 244/145 |
| 4,705,238 | A | * | 11/1987 | Gargano | 244/145 |
| 5,197,696 | A | * | 3/1993 | Coe | 244/145 |
| 5,201,482 | A | * | 4/1993 | Ream | 244/145 |
| 5,573,207 | A | * | 11/1996 | Germain | 244/145 |
| 5,967,463 | A | * | 10/1999 | Payne | 244/145 |
| 6,726,150 | B2 | * | 4/2004 | Preston | 244/145 |

FOREIGN PATENT DOCUMENTS

GB        2084090 A    *  9/1980  .............. 244/145

* cited by examiner

Primary Examiner—Michael J. Carone
Assistant Examiner—L. Semunegus
(74) Attorney, Agent, or Firm—Bourque & Associates

(57) ABSTRACT

An improved ram air canopy is disclosed having a top skin formed of a plurality of substantially rectangular top skin pieces. Each top skin piece has areas of reduced width at predetermined locations. The areas of reduced width result in a specific tension pattern of the top skin so as to reduce distortion. The increased tension pattern of the top skin better maintains the modeled desired airfoil shape of the canopy.

14 Claims, 3 Drawing Sheets

RAM AIR PARACHUTE WITH TENSIONED TOP SKIN

BACKGROUND OF THE INVENTION

1. Field of the Invention

The present invention relates to ram air canopy parachutes and more particularly a ram air parachute canopy with improved tensioning to maintain a desired shape during flight.

2. Discussion of Related Art

Parachutes have evolved over the years into highly sophisticated systems, and often include features that improve the safety, maneuverability, and overall reliability of the parachutes. Initially, parachutes included a round canopy. A skydiver was connected via a harness/container system to the canopy by suspension lines disposed around the periphery of the canopy. Such parachutes severely lacked control. The user was driven about by winds without any mechanism for altering direction. Furthermore, such parachutes had a single descent rate based upon the size of the canopy and the weight of the parachutist.

In the mid-1960's the parasol canopy was invented. Since then, variations of the parasol canopy have replaced round canopies for most applications, particularly for aeronautics and the sport industry. The parasol canopy, also known as a ram air canopy, is formed of two layers of material—a top skin and a bottom skin. The skins may have different shapes but are commonly rectangular or elliptical. The two layers are separated by vertical ribs to form cells. The top and bottom skins are separated at the lower front of the canopy to form inlets. During descent, air enters the cells of the canopy through the inlets. The vertical ribs are shaped to maintain the canopy in the form of an airfoil when filled with air. Suspension lines are attached along at least some of the ribs to maintain the orientation of the canopy relative to the ground. The canopy of the ram air parachute functions a wing to provide lift and forward motion. Guidelines operated by the user allow deformation of the canopy to control direction and speed. Ram air parachutes have a high degree of maneuverability.

The shape of the canopy of a ram air parachute during flight is affected by the air passing thorough and around the canopy. Under canopies of conventional design, the leading edge or nose of the ram air parachute is deformed during flight. Since the skins and ribs are formed of highly flexible materials, they provide little structure for maintaining the shape of the canopy. The shape is provided by the internal pressurization caused by air entering the inlets. However, with forward motion, the head-on wind overcomes the internal pressurization of the canopy, and deforms the nose of the canopy. The deformation impairs the aerodynamics of the parachute making the parachute fly less efficiently. Therefore, a need exists for a canopy for a ram air parachute which reduces deformations of the nose.

Paragliders and powered parachutes, which operate with similar designs to ram air parachute canopies, overcome the deformation problem by including "stiffeners" in the nose of the canopy. Typically, the stiffeners are plastic or mylar sheets sewn on the vertical ribs of the canopy., typically sewn into the nose of the canopy on the vertical ribs. The stiffeners reinforce the nose of the canopy and help maintain its shape. The stiffeners also function to keep open the inlets of the canopy when not inflated to aid in the launching of para-gliders and powered parachutes. However, the stiff plastic or mylar used in paragliders and powered parachutes is not applicable to skydiving or other freefall deployable parachutes. A deployable system must be packed into a small space and must open efficiently. The stiffeners cannot be crushed for packing and cannot be arranged for effective deployment. When stiffeners become crushed, they remain creased or bent and create additional deformation of the nose of the canopy, which hinders proper operation of the parachute. Packing of such paraglider or powered parachute is not possible due to the stiffeners.

During flight, when the canopy is inflated, the loading and pressure distribution result in an airfoil shape which is not a smooth shape. Since canopies are flexible structures, they tend to distort based upon tensions, stresses, and airflows. Accordingly, as the parachute glides through the air, the pressurization of the canopy causes the canopy to stretch, particularly at the nose of the canopy. The stretching of the canopy causes the wing-shape of the parachute to distort such that the aerodynamics are compromised, thus resulting in efficiencies. Moreover, the performance of the parachute is decreased over time due to the span-wide stretching of the canopy.

Although a cell is modeled as having a basically rectangular cross section, when inflated, the shape distorts towards round. Typically, in a ram air parachute, suspension lines are attached to every other rib, thus creating loaded ribs (i.e., ribs to which suspension lines are attached) and non-loaded ribs (i.e., ribs which do not have suspension lines attached thereto). The different stresses on the loaded and non-loaded ribs also distorts the cell shape. FIG. 1 illustrates a cross section of a portion of a typical ram air parachute canopy 500 during flight. FIG. 1 shows four cells 501, 502, 503, 504 with three loaded ribs 510, 511, 512 and two non-loaded ribs 521, 522. Suspension lines 541, 542, 543 are attached to the loaded ribs 510, 511, 512. The top skin 530 and bottom skin 531 tend to arc between the ribs during inflation. Also, the non-loaded ribs 521, 522 tend to be higher than the loaded ribs 510, 511, 512, which provides a distortion along the width of the canopy. The distortion is aerodynamically undesirable and adversely affects performance of the canopy.

In order to keep the loaded and non-loaded ribs level and to improve upon the aerodynamics of the canopy, cross-bracing between ribs has been added to the canopy. U.S. Pat. No. 4,930,728 illustrates such a design. FIG. 2 illustrates a design with cross-bracing, called a "tri-cell" configuration. In the tn-cell configuration, there are two non-loaded ribs 720, 721 between the loaded ribs 710, 711. Cross braces 751, 752 connect the bottom of each loaded rib 710, 711 with the top of a non-loaded rib 720, 721. Accordingly, the cross brace angle is not too acute. The resulting canopy has three, small, span-wise distortions between loaded ribs instead of two large distortions as in a canopy without cross bracing. Since the cell between non-loaded ribs has no cross-bracing, this design is less rigid than a fully cross-braced canopy.

Cross-bracing suffers from a number of drawbacks. The cross-bracing results in a complicated construction, high manufacturing costs, and increased packing volume. The tri-cell design has a packing volume approximately 25% larger than a non-cross braced design for a nine cell canopy. Furthermore, the rigidity induced by the cross-bracing creates high opening forces. Typically, large cross porting is used on all of the cells, which causes the canopy to essentially inflate all at once. The opening forces can be so severe that they can jar the jumper's body causing discomfort and even serious injuries. Although designers have implemented "formed" noses, larger sliders, moved bridal attachment points and modified line trims to try to soften the openings of such cross-braced canopies, it has generally yielded only limited improvement to the point where the openings are marginally acceptable.

Accordingly, a need exists for a canopy design which reduces distortion without having to use cross braces.

SUMMARY OF THE INVENTION

The deficiencies of the prior art are substantially overcome by the ram air canopy of the present invention having a top skin, a bottom skin and a plurality of vertical ribs. The top skin is substantially rectangular along each cell of the canopy between pairs of vertical ribs. However, at various points along the edges of each cell, the top skin is non-rectangular having a reduced width. When inflated, the areas of reduced width in the top skin have a higher tensions than the surrounding areas. The higher tension in these areas creates a stress pattern to maintain the intended shape of the canopy.

According to one aspect of the invention, the areas of reduced width are located along the leading edge of the top skin. According to another aspect of the invention, the areas of reduce width are located near the apex of the airfoil shape of the canopy. According to another aspect of the invention, the areas of reduce width are located behind the apex of the airfoil shape of the canopy above the second suspension line attachment point. According to another aspect of the invention, the areas of reduce width are located near the trailing edge of the canopy.

DETAILED DESCRIPTION

Figure 1:
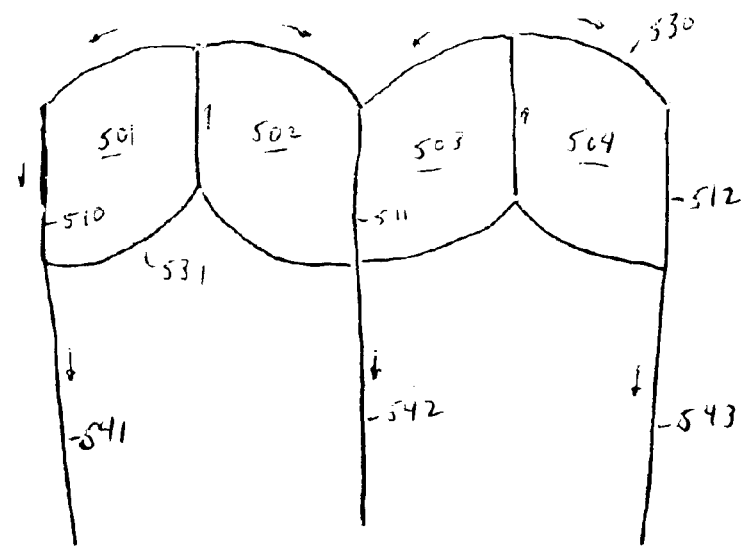
FIG. 1 is a cross section view of cells in non-cross-braced canopy of the prior art.
Figure 2:
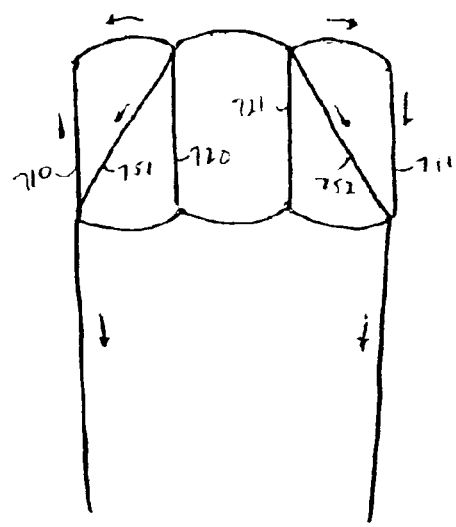
FIG. 2 is a cross section view of cells in a tri-cell crossbraced canopy of the prior art.
Figure 3:
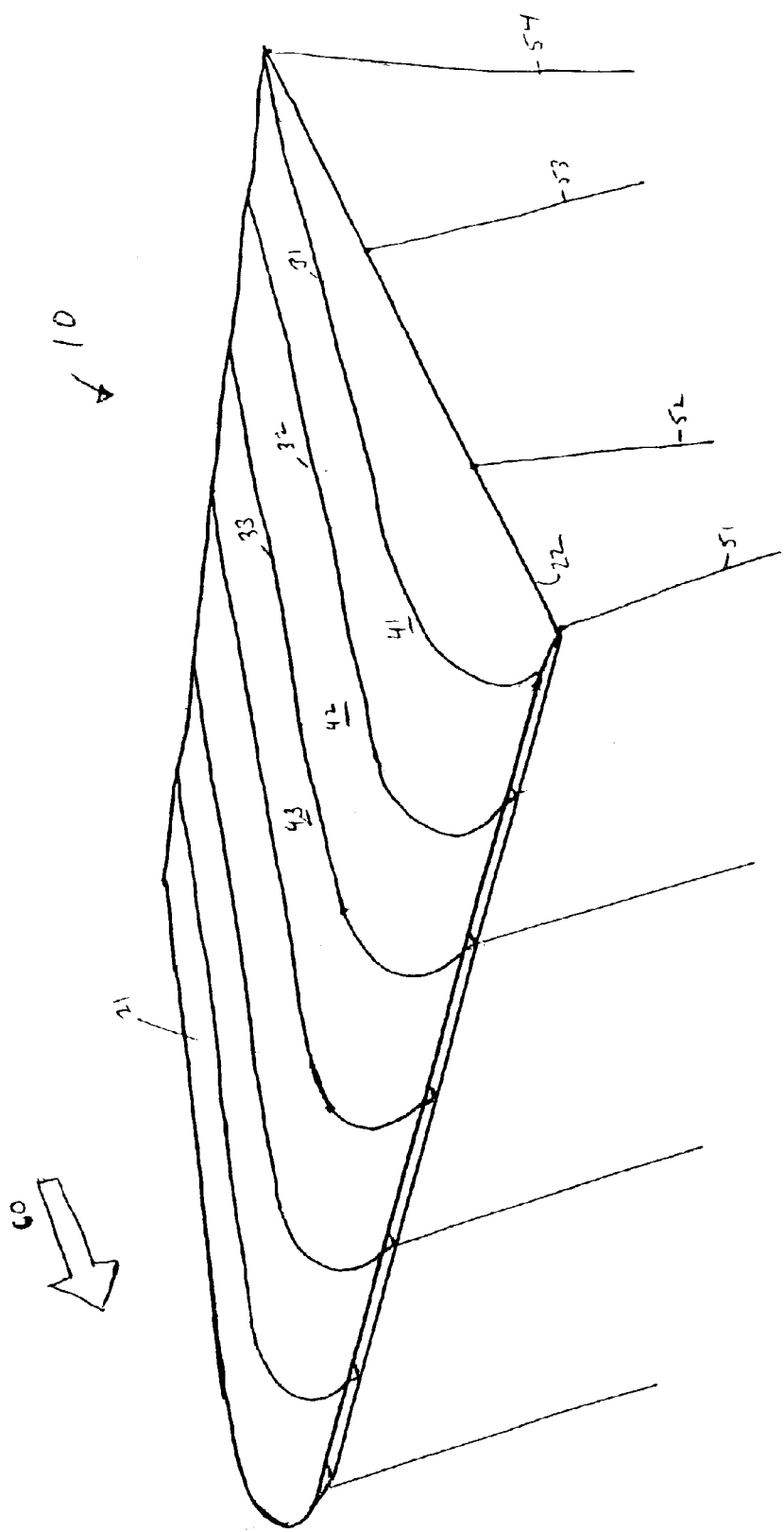
FIG. 3 is a perspective view of a ram air parachute.

FIG. 3 illustrates a canopy of a ram air parachute 10 according to an embodiment of the present invention. The ram air parachute 10 includes a top skin 21 and bottom skin 22. A plurality of vertical ribs 31, 32, 33 are formed between the top skin 21 and the bottom skin 22 forming a plurality of cells 41, 42, 43. Typically, ram air parachutes to which the present invention applies have seven or nine cells. However, any number of cells can be used in connection with the present invention. Suspension lines 51, 52, 53, 54 are attached to at least some of the plurality of ribs. Not all of the suspension lines are shown in FIG. 1. Generally, suspension lines are attached to every other rib in the ram air parachute. The suspension lines are connected together to provide proper suspension of the user below the canopy and maintain the structure and the orientation of the canopy with respect to the pilot.

Figure 4:
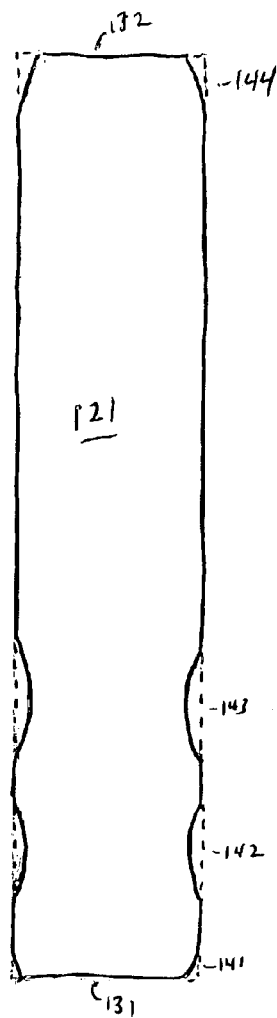
FIG. 4 is a top view of a top skin panel for a single cell of a canopy according to an embodiment of the present invention.

FIG. 4 is a top view of a top skin piece 121 of a canopy according to an embodiment of the present invention. The top skin piece 121 corresponds to a single cell of the canopy. A plurality of top skin pieces 121 are connected together to form the top skin 21 of the entire canopy.

Figure 5:
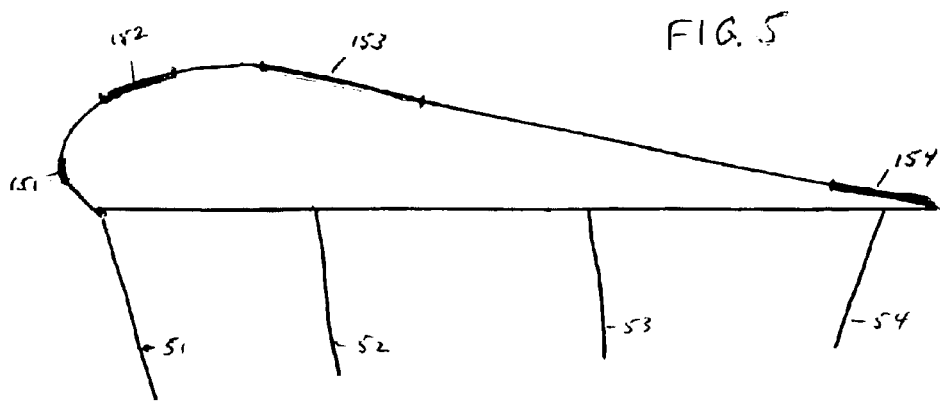
FIG. 5 is a side view of a vertical rib of a canopy illustrating areas of increase tensioning.

As illustrated in FIG. 4, the top skin piece 121 is substantially rectangular having a constant width along its entire length from the leading edge 131 to the trailing edge 132. However, reduced width areas 141, 142, 143, 144 are strategically located along one or more areas on the length of the top skin piece. The reduction in width is slight. For a nine cell, ten foot canopy, having top skin pieces with widths of approximately thirteen inches, the reduction in width may be ¼ to 1 inch, along each side. The reduced width areas 141, 142, 143, 144 are positioned to correspond to specific parts of the airfoil shape of the canopy. FIG. 5 illustrates various locations of reduced width along a vertical rib of the canopy according to an embodiment of the present invention. A first area of reduced width 141 corresponds to the leading edge 151 of the top skin of the canopy. A second area of reduced width 142 corresponds to an position 152 near the apex of the airfoil shape. This position 151 starts substantially above the connection point for the leading suspension line 51 and extends towards the trailing edge of the canopy. A third area of reduced width 143 corresponds to a position 153 behind the apex of the airfoil shape. This position 153 is substantially over the connection point for the second suspension line 52. A final area of reduced width 144 is located at the trailing edge of the top skin 21 corresponding to a position 154 at the trailing edge of the canopy.

During flight, the cells of the canopy are inflated by air passing into the inlet at the leading edge and exiting at the trailing edge of the canopy. The inflation tensions the flexible fabric forming the top skin 21, bottom skin 22, and vertical ribs 31, 32, 33 and deforms the cells from an ideal rectangular cross section. Additionally, head winds provide additional forces on the leading edge of the canopy and further distort the shape. Also, pressures from air passing over and under the canopy create forces which can cause distortions in the ideal shape. The areas of reduce width 141, 142, 143, 144 on the top skin pieces 121 create areas of increased tension on the top skin 21 at predetermined locations in the air foil shape. The increased tension on the top skin 21 at these locations limits the distortions caused by inflation, headwind, and air movement forces. Thus, the canopy of the present invention better maintains the ideal air foil shape and has improved performance. Of course, the present invention is not limited to the specific areas of reduced width 141, 142, 143, 144 and corresponding positions 151, 152, 153, 154 along the airfoil shape. The location of areas for tensioning of the top skin will depend upon the specific design and performance characteristics of the canopy.

Other mechanisms could be used for tensioning the top skin of the canopy other than variations in the straight edges of the top skin pieces. For example, in a canopy having reinforcement tape along the leading edge of the canopy, the reinforcement tape could be selectively tensioned during assembly to provide tensioning of the top skin. Similarly, reinforcement tape on any seams may be selectively tensioned to achieve the objectives of the present invention.

As the inventive method reduces spanwise top skin distortion, it increases the wings' efficiency. As a result, a smaller canopy can be used for a given weight. This was demonstrated by jumping and landing in a 55 square foot canopy. This is the smallest 9 cell personal canopy ever landed. Additionally, the benefits of the invention are seen as the tensioned canopy can now be loaded an fly efficiently at wing loads significantly higher than prior art. Additional records have been set flying inventive personal canopies up to 5 pounds per square foot, and cargo at up to 10 pounds per square foot.

While the present inventions have been described with a certain degree of particularity, it is obvious from the foregoing detailed description that one skilled in the art may make one or more modifications which are suggested by the above descriptions of the novel embodiments.

What is claimed is:

1. A ram air canopy comprising:
   a top skin;
   a bottom skin opposite the top skin;
   a plurality of vertical ribs disposed between the top skin and the bottom skin; and
   means for tensioning the top skin in a spanwise direction at discrete locations along the ribs according to a predetermined pattern so as to reduce distortion.

2. The ram air canopy according to claim 1, wherein the means for tensioning the top skin include a plurality of areas of reduced width at each of the vertical ribs and aligned parallel to a leading edge of the canopy.

3. The ram air canopy according to claim 1, wherein the means for tensioning involves sewing pretensioned tapes to locations on the canopy.

4. The ram air canopy according to claim 1, wherein the predetermined pattern includes tensioning the top skin at least at a leading edge of the canopy.

5. The ram air canopy according to claim 1, wherein the predetermined pattern includes tensioning the top skin at least near an apex of the canopy.

6. The ram air canopy according to claim 1, wherein the predetermined pattern includes tensioning the top skin at least behind an apex of the canopy.

7. The ram air canopy according to claim 1, wherein the predetermined pattern includes tensioning the top skin at least substantially above a connection point for a second suspension line of the canopy.

8. The ram air canopy according to claim 1, wherein the predetermined pattern includes tensioning the top skin at least at a trailing edge of the canopy.

9. A ram air canopy comprising:
   a top skin formed of a plurality of top skin pieces;
   a bottom skin opposite the top skin;
   a plurality of vertical ribs disposed between the top skin and the bottom skin such that each of the plurality of top skin pieces is disposed between two adjacent vertical ribs; and
   each top skin piece is a substantially rectangular piece of fabric with areas of reduce width at predetermined locations.

10. The ram air canopy according to claim 9, wherein at least one of the predetermined locations is at a leading edge of the canopy.

11. The ram air canopy according to claim 9, wherein at least one of the predetermined locations is near an apex of the canopy.

12. The ram air canopy according to claim 9, wherein at least one of the predetermined locations is behind an apex of the canopy.

13. The ram air canopy according to claim 9, wherein at least one of the predetermined locations is substantially above a connection point for a second suspension line of the canopy.

14. The ram air canopy according to claim 9, wherein at least one of the predetermined locations is at a trailing edge of the canopy.

* * * * *